United States Patent [19]
Albers et al.

[11] Patent Number: 5,634,851
[45] Date of Patent: Jun. 3, 1997

[54] APPARATUS FOR DAMPING-TORSIONAL VIBRATIONS

[75] Inventors: Albert Albers, Bühl; Johann Jäckel, Baden-Baden; Hartmut Mende, Sinzheim, all of Germany

[73] Assignee: LuK Lamellen und Kupplungsbau GmbH, Bühl, Germany

[21] Appl. No.: 314,428

[22] Filed: Sep. 28, 1994

[30] Foreign Application Priority Data

Sep. 28, 1993 [DE] Germany ............ 43 32 822.9

[51] Int. Cl.⁶ ............................................. F16D 3/14
[52] U.S. Cl. ....................... 464/64; 192/212; 464/68
[58] Field of Search .................... 464/66, 64, 68, 464/24; 192/208, 212, 213, 213.2, 70.17, 106.2; 74/574

[56] References Cited

U.S. PATENT DOCUMENTS

| | | | |
|---|---|---|---|
| 4,376,477 | 3/1983 | Loizeau | 464/68 X |
| 4,433,770 | 2/1984 | Loizeau et al. | 192/70.17 X |
| 4,465,172 | 8/1984 | Gatewood | 464/68 X |
| 4,480,736 | 11/1984 | Loizeau | 192/70.17 X |
| 4,723,463 | 2/1988 | Reik | 74/574 |
| 5,070,974 | 12/1991 | Kirkwood | 464/24 X |
| 5,245,889 | 9/1993 | Kohno et al. | 464/68 X |
| 5,322,149 | 6/1994 | Szadkowski | 192/70.17 |
| 5,360,090 | 11/1994 | Stretch et al. | 192/212 X |

FOREIGN PATENT DOCUMENTS

| | | |
|---|---|---|
| 37 21 711 | 1/1988 | Germany. |
| 37 21 712 | 1/1988 | Germany. |
| 39 09 892 | 10/1989 | Germany. |
| 41 17 571 | 12/1991 | Germany. |
| 41 17 579 | 12/1991 | Germany. |

*Primary Examiner*—Daniel P. Stodola
*Assistant Examiner*—Eileen A. Dunn
*Attorney, Agent, or Firm*—Darby & Darby

[57] ABSTRACT

An apparatus which can transmit torque between the crankshaft or the camshaft of a combustion engine and the input shaft of a variable-speed transmission in the power train of a motor vehicle employs a damper having a rotary input member normally receiving torque from the engine, an output member rotatable with and relative to the input member and normally transmitting torque to the transmission, and a set of arcuate coil springs which yieldably oppose angular movements of the input and output members relative to each other with a first force which increases in response to increasing angular movements of the input and output members relative to each other and with a second force which is generated by centrifugal force and increases in response to increasing RPM of the engine. At least one additional spring is provided to oppose angular movements of the input and output members relative to each other (particularly when the vehicle is coasting) with a third force which increases in response to increasing angular movement of the input and output members relative to each other but is at least substantially independent of the centrifugal force.

21 Claims, 4 Drawing Sheets

APPARATUS FOR DAMPING-TORSIONAL VIBRATIONS

BACKGROUND OF THE INVENTION

The invention relates to improvements in apparatus for transmitting torque between a rotary input element and a rotary output element. More particularly, the invention relates to improvements in torque transmitting apparatus of the type embodying one or more dampers which prevent the transmission of oscillations and/or other undesirable changes of torque which is being transmitted between a rotary input element and a rotary output element. Still more particularly, the invention relates to improvements in dampers which are or which can be utilized in the power trains between the prime movers (such as combustion engines) and variable-speed transmissions and/or other driven units of motor vehicles.

It is known to utilize in the power train of a motor vehicle a damper which includes at least one set of arcuate energy storing elements (e.g., in the form of coil springs), a rotary input member which normally receives torque from the rotary output element (e.g., a crankshaft or a camshaft) of an engine, and a rotary output member which can transmit torque to a variable-speed transmission. The energy storing elements serve to yieldably oppose angular movements of the input and output members relative to each other. The input member of the damper can constitute a first or primary flywheel which can be attached to the rotary output element of an engine, and the output member of the damper can include or can constitute a second or secondary flywheel which can drive the input shaft of a variable-speed transmission by way of an engageable and disengageable friction clutch. Reference may be had, for example, to published German patent applications Nos. 39 09 892, 41 17 571 and 41 17 579 as well as to the corresponding patent applications and/or patents applied for and granted in countries other than Federal Republic Germany.

Torque transmitting apparatus embodying dampers of the character disclosed in the aforementioned published German patent applications have met with considerable success. However, the operation of dampers presently utilized in such torque transmitting apparatus is not entirely satisfactory when the apparatus is installed in certain types of motor vehicles and under certain circumstances of the use of such vehicles. For example, certain types of combustion engines, power trains between the engines and the wheels and/or chassis of the respective vehicles cause the generation of undesirable noise, such as humming, when the RPM of the output element of the engine is within a certain range. Such noise is more likely to develop when the vehicle is coasting, i.e., when the wheels transmit torque to the power train which, in turn, transmits torque to the output element of the engine. The reason for the generation of such noise, particularly when the vehicle is coasting, is believed to be that the heretofore known dampers are incapable of preventing the transmission of oscillatory and other stray movements between the input and output members of the dampers.

OBJECTS OF THE INVENTION

An object of the invention is to provide a novel and improved apparatus for transmission of torque between the rotary output element of a prime mover and the rotary input element or elements of one or more units which can, or which normally, receive torque from the prime mover.

Another object of the invention is to provide a novel and improved damper for use in the above-outlined torque transmitting apparatus.

A further object of the invention is to provide a damper whose ability to absorb undesirable oscillations of transmitted torque is superior to those of heretofore known dampers.

An additional object of the invention is to provide the above-outlined apparatus with a damper which can absorb or counteract vibrations of torque being transmitted from a first rotary element to a second rotary element or in the opposite direction.

Still another object of the invention is to provide an apparatus which can be utilized with particular advantage in the power trains between the prime movers (such as combustion engines) and the wheels of motor vehicles.

A further object of the invention is to provide a power train which generates less noise when a vehicle embodying the power train is coasting than heretofore known power trains, and whose space requirements do not, or need not, exceed those of conventional power trains.

Another object of the invention is to provide a vehicle which embodies the above-outlined power train.

An additional object of the invention is to provide a simple, compact and inexpensive torque transmitting apparatus which can be utilized as a superior substitute for heretofore known torque transmitting apparatus in the power trains of existing motor vehicles.

Still another object of the invention is to provide a novel and improved method of preventing or at least greatly reducing the generation of noise under circumstances (such as while a motor vehicle is coasting) which cause the conventional torque transmitting apparatus to generate readily detectable noise.

A further object of the invention is to provide a novel and improved damper of the type having input and output members rotatable with and relative to each other and a set of energy storing elements in the form of, or including, coil springs which are spaced apart from the common axis of the input and output members.

SUMMARY OF THE INVENTION

The invention is embodied in an apparatus which serves to transmit torque between a variable-speed rotary output element and a variable-speed rotary input element, particularly between the output element (e.g., a crankshaft or a camshaft) of a prime mover (such as a combustion engine) and the input element (such as a shaft) of a transmission (e.g., a variable-speed transmission) in a motor vehicle. The improved apparatus comprises a damper including coaxial input and output members rotatable with, and relative to, each other about a common axis which can coincide with the axis of rotation of at least one of the rotary input and output elements. The damper further comprises elongated arcuate first resilient energy storing elements which are preferably disposed at a substantial radial distance from the common axis of the input and output members and serve to yieldably resist rotation of the input and output members relative to each other in at least one direction with a first force which increases in response to increasing angular displacement of the input and output members relative to each other in the at least one direction. The first energy storing elements further serve to frictionally engage at least one of the input and output members under the action of centrifugal force with a second force which acts in parallel with the first force and increases in response to increasing speed of the input and output members. The damper also comprises at least one second energy storing element which is positioned in series with the first energy storing elements to yieldably oppose rotation of the input and output members relative to each other in the at least one direction with a variable third force which increases in response to increasing angular movement of the input and output members relative to each other in the at least one direction, but is at least substantially independent of the centrifugal force.

At least one of the first energy storing elements can comprise at least one coil spring. It is presently preferred to construct and assemble the damper in such a way that each of the first energy storing elements comprises an elongated arcuate coil spring. It is also possible to construct and assemble the damper in such away that at least one of the first energy storing elements includes a series of relatively short springs (such as coil springs) which are disposed one behind the other in a circumferential direction of the input and output members.

One of the input and output members can define an annular chamber for the first energy storing elements.

The at least one second energy storing element can comprise or constitute a cantilever spring.

One of the input and output members (e.g., the output member) can include a substantially disc-shaped carrier and the at least one second energy storing element can be of one piece with the disc-shaped carrier. For example, the output member can comprise a first portion (e.g., a flywheel), a second portion which includes or constitutes the disc-shaped carrier, and means (e.g., rivets or other suitable fasteners) for affixing the second portion to the first portion.

The at least one second energy storing element can be configured, dimensioned and mounted in such a way that it is operative to yieldably oppose rotation of the input and output members relative to each other only when the input element transmits torque to the output element. Thus, when the improved damper forms part of a power train in a motor vehicle, the at least one second energy storing element can be installed to oppose rotation of the input and output members relative to each other while the motor vehicle is coasting.

The at least one second energy storing element can constitute a spring having a torsional spring rate of between about 15 Nm/° and 50 Nm/°, preferably between about 25 Nm/° and 40 Nm/°.

Furthermore, the at least one second energy storing element can be constructed and positioned to oppose rotation of the input and output members relative to each other in the at least one direction through an angle of between about 1.5° and 5°, preferably an angle of between about 2° and 4°. Such selection of the third force is particularly advantageous if the at least one second energy storing element is installed in the power train between the engine and the transmission of a motor vehicle to yieldably oppose rotation of the input and output members relative to each other in the at least one direction while the vehicle is coasting.

The magnitude of the third force can exceed the sum of the first and second forces, while the prime mover of the vehicle having a power train which embodies the improved damper is idling. Otherwise stated, the sum of the first and second forces generated by the first energy storing elements can be selected in such a way that it at most matches the third force while the prime mover of the vehicle is idling.

The input and output members can be driven in such a way that they are rotatable within a range of relatively low speeds and within a range of second speeds higher than the relatively low speeds. The sum of the first and second forces is, or can be, greater than the third force at least within the aforementioned range of second speeds.

The input member of the damper can include a first flywheel and the output member of the damper can include a second flywheel which can transmit torque to the input shaft of a variable-speed transmission in a motor vehicle by way of a friction clutch.

The novel features which are considered as characteristic of the invention are set forth in particular in the appended claims.

BRIEF DESCRIPTION OF THE DRAWINGS

The improved torque transmitting apparatus itself, both as to its construction and its mode of operation, together with additional features and advantages thereof, will be best understood upon perusal of the following detailed description of certain presently preferred specific embodiments with reference to the accompanying drawings, wherein.

DESCRIPTION OF PREFERRED EMBODIMENTS

Figure 2:
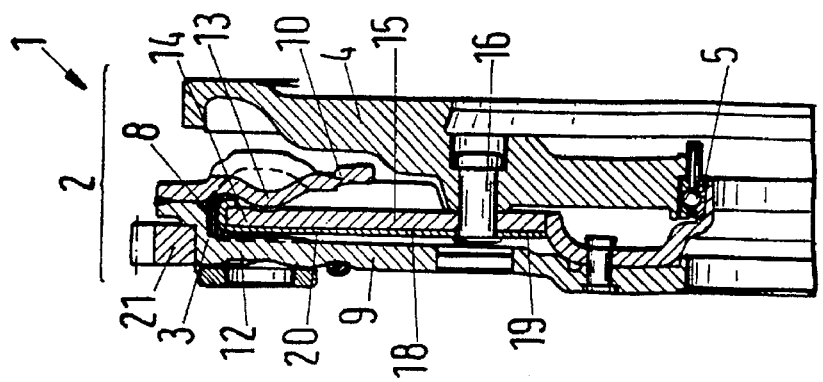
FIG. 2 is an axial sectional view of a portion of the apparatus substantially as seen in the direction of arrow II in FIG. 1.
Figure 1:
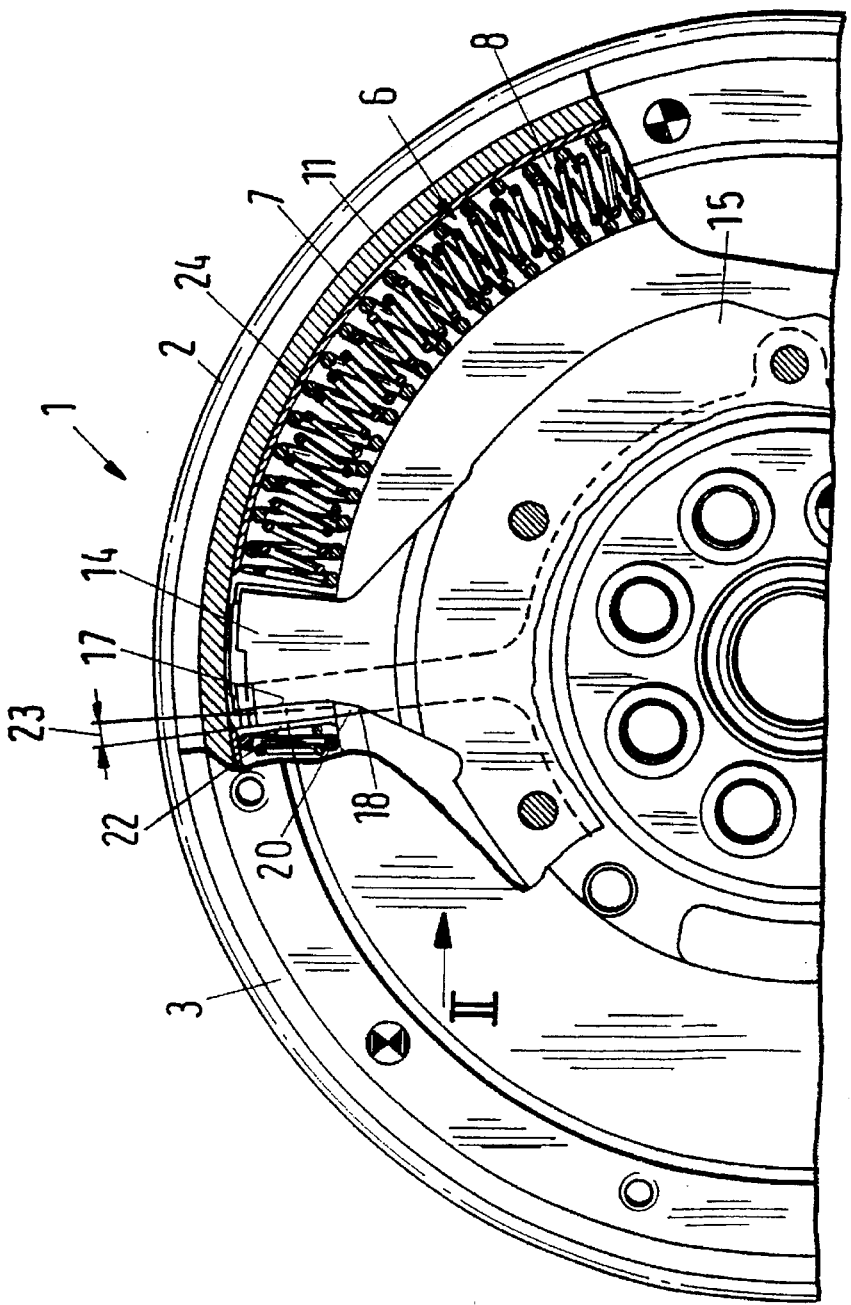
FIG. 1 is a fragmentary side elevational view of a torque transmitting apparatus utilizing a damper which embodies one form of the present invention, a portion of one of the flywheels being broken away.

FIGS. 1 and 2 illustrate a portion of a torque transmitting apparatus 1 which can be utilized in the power train between the prime mover (e.g., a combustion engine) and one or more driven units (e.g., wheels) of a motor vehicle. Reference may be had, for example, to commonly owned U.S. Pat. No. 4,723,463 granted Feb. 9, 1988 to Reik et al. for "Assembly For Taking Up And Compensating For Torque-Induced Shocks" which shows the rotary output element of an engine, the rotary input element of a transmission, and an apparatus which serves to transmit torque between the engine and the transmission and employs a damper in series with a slip clutch. The disclosure of the patent to Reik et al. is incorporated herein by reference.

The apparatus 1 comprises a composite flywheel 2 including a first or primary flywheel 3 which can receive torque from or can transmit torque to the output element (e.g., a crankshaft or a camshaft) of the engine, and a second or secondary flywheel 4 which is coaxial with the flywheel 3 and serves to transmit torque to or to receive torque from the input shaft of a variable-speed transmission. A bearing 5 (e.g., an anti-friction bearing having at least one annulus of rolling elements) is provided to center the flywheels 3, 4 relative to each other and to permit angular movements of the flywheel 3 relative to the flywheel 4 and/or vice versa. The extent of such angular movement is determined by a damper 6 which is constructed, assembled and mounted, and which operates in accordance with a first embodiment of the present invention. The primary flywheel 3 constitutes the input member of the damper 6, the secondary flywheel 4 forms part of the output member of the damper 6, and the latter further comprises a set of first energy storing elements 7 in the form of elongated arcuate coil springs having large radii of curvature, i.e., the elements 7 are installed at a substantial radial distance from the common axis of the flywheels 3 and 4. The damper 6 which is shown in FIGS. 1 and 2 is assumed to comprise two arcuate energy storing elements 7 in the form of coil springs, each of which extends along an arc of close to 180° and each of which acts in the circumferential direction of the flywheels 3 and 4. The length of each coil spring 7 (as measured in the circumferential direction of the input and output members) is a multiple of the width of each such spring (as measured radially of the common axis of the flywheels 3 and 4). It is presently preferred to impart to the coil springs 7 an arcuate shape prior to their installation between the flywheels 3 and 4 so that their curvature need not be altered at all or must be altered only to a relatively minor extent for the purpose of positioning them in an annular chamber 8 which is defined by the radially outer portion of the flywheel 3. At least a major portion of that part of the chamber 8 which is not occupied by the convolutions of the coil springs 7 is filled with a viscous lubricant, e.g., grease.

At least a major portion of the annular chamber 8 is defined by two ring-shaped walls 9, 10 which form part of the primary flywheel 3 and can be made of metallic sheet material. The radially outer portions of the walls 9 and 10 are bonded (e.g., welded) to each other to seal the radially outermost portion of the chamber 8 from the surrounding atmosphere, and the radially outer portion of the wall 9 carries a customary starter gear 21.

The annular chamber 8 is subdivided into arcuate compartments 11, one for each of the coil springs 7. The neighboring ends of the arcuate compartments 11 are partially separated from each other by two pairs of confronting abutments or stops 12 and 13 which are respectively provided on, and can be said to constitute pockets of, the walls 9 and 10. For example, such pockets, abutments or stops can be obtained by depressing the corresponding portions of the respective walls 9 and 10 so that each depressed portion of the wall 9 extends toward a depressed portion of the wall 10 and vice versa when the radially outer portions of the walls 9, 10 are bonded to each other subsequent to insertion of the coil springs 7 into their respective compartments 11.

The compartments 11 of the chamber 8 are further partially separated from each other by abutments or stops 14 which constitute radially outwardly extending arms of a disc-shaped carrier 15 forming part of the output member of the damper 6. The secondary flywheel 4 constitutes a first portion and the carrier 15 constitutes a second portion of the output member of the damper 6, and such portions 4 and 15 are affixed to each other by a set of rivets 16 and/or other suitable fasteners disposed radially inwardly of the annular chamber 8. When the flywheels 3 and 4 are maintained in their neutral positions (namely when they are not called upon to transmit torque between the output element of a prime mover and the input element or elements of one or more driven units) each of the two arms 14 forming part of the carrier 15 is disposed in the relatively narrow space between a pocket 12 of the wall 9 and the adjacent pocket 13 of the wall 10. The carrier 15 can be made from metallic sheet material and the secondary flywheel 4 can transmit torque to the input element of a variable-speed transmission by way of an engageable and disengageable friction clutch, for example, in a manner as fully described and shown in the aforementioned patent to Reik et al.

The coil springs 7 of the damper 6 are stressed by the arms 14 and the pockets 12, 13 when the flywheels 3, 4 are caused to turn relative to each other. When the engine of a motor vehicle having a power train which embodies the structure of FIGS. 1 and 2 is caused to pull a load (i.e., to drive the wheels of the vehicle), the arms 14 bear directly against the adjacent end convolutions of the springs 7 and cause such springs to store energy or to store additional energy. However, when the vehicle is coasting (i.e., when the input element of the transmission causes the secondary flywheel 4 to rotate the primary flywheel 3 and hence the output element of the engine), the initial stage of angular displacement of the flywheel 4 relative to the flywheel 3 does not involve any direct engagement between the arms 14 and the adjacent end convolutions of the respective coil springs 7. This is accomplished by the provision of second energy storing elements 18 in the form of springs installed between the adjacent portions 17 of the arms 14 and the respective coil springs 7. The springs 18 are installed in such a way that they operate in series with the coil springs 7.

The arms 14 of the carrier 15 forming part of the output member of the damper 6 are preferably equidistant from each other in the circumferential direction of the flywheels 3 and 4. Thus, and since the damper 6 of FIGS. 1 and 2 comprises two coil springs 7 and therefore the carrier 15 comprises two radially outwardly extending arms 14, these arms are disposed diametrically opposite each other. Furthermore, the two coil springs 7 can be and preferably are identical with each other.

The springs 18 of the damper 6 extend radially outwardly from a circumferentially complete relatively thin disc-shaped member 19 which is secured to the output member of the damper 6. In the embodiment of FIGS. 1 and 2, the member 19 is affixed to the flywheel 4 and to the carrier 15 of the output member of the damper 6 by the aforementioned rivets 16. The one-piece body 20, including the member 19 and the springs 18, is disposed at one side of the carrier 15 and faces the wall 9 of the primary flywheel 3.

The springs 18 extend, at least in part, radially outwardly beyond the adjacent portions 17 of the respective arms 14 and act not unlike leaf springs or cantilever springs (hereinafter called cantilever springs). The radially outermost portions of the cantilever springs 18 are substantially U-shaped in that they are bent around the adjacent portions of the arms 14. This ensures that the cantilever springs 18 are maintained in a predetermined plane which is normal or nearly normal to the common axis of the flywheels 3 and 4. Those portions (22) of the cantilever springs 18 which extend in the circumferential direction beyond the portions 17 of the respective arms 14 (as seen in the direction of angular movement of the flywheel 4 and carrier 15 relative to the flywheel 3 when the vehicle is coasting) are spaced apart from the respective arms 14 in the circumferential direction of the flywheels. The extent of such angular displacement is shown in FIG. 1, as at 23.

The angles 23 determine the extent to which the cantilever springs 18 oppose rotation of the flywheels 3 and 4 relative to each other when the vehicle is coasting. The magnitude of each angle 23 will depend upon the make and/or other parameters of the vehicle. It is presently preferred to select the angles 23 in such a way that each thereof is not appreciably smaller than 1.5° and does not appreciably exceed 5°, a presently preferred range being between about 2° and 3°. Thus, the cantilever springs 18 must undergo a certain amount of deformation (i.e., they must store certain amounts of energy) before the portions 17 of the arms 14 forming part of the output member of the damper 6 can directly engage the adjacent end convolutions of the respective springs 7. This takes place while the vehicle is coasting. The cantilever springs 18 yield in the circumferential direction of the flywheels 3 and 4 in order to enable the portions 17 of the arms 14 to move into direct engagement with the adjacent end convolutions of the respective springs 7. Such yielding of the cantilever springs 18 entails an increased overlap of the carrier 15 and the member 20 in the circumferential direction relative to each other.

An important advantage of the damper 6 of FIGS. 1 and 2 is that the cantilever springs 18 need not transmit torque exceeding a preselected value. Thus, the springs 18 must undergo a certain amount of deformation in response to angular displacement of the flywheel 4 relative to the flywheel 3 while the vehicle is coasting and the portions 17 of the arms 14 are thereupon free to directly engage the adjacent springs 7 so that the springs 7 are ready to transmit increasing torque if the flywheel 4 continues to turn relative to the flywheel 3.

The combined torsional rate of springs 7 can be between about 1 Nm/° and 8 Nm/°, preferably between about 2 Nm/° and 4 Nm/°. On the other hand, the combined torsional spring rate of the cantilever springs 18 can be in the range of between 15 Nm/° and 50 Nm/°, preferably between about 25 Nm/° and 40 Nm/°. Thus, the resistance which the cantilever springs 18 offer to angular displacement of the flywheels 3 and 4 relative to each other per degree can greatly exceed the resistance of the coil springs 7. The above-outlined resistance of the coil springs 7 has been arrived at by resorting to statistical measurements while the primary flywheel 3 was not turned at all or was caused to rotate at a very low speed.

Due to the fact that the second energy storing elements 18 of the damper are cantilever springs, the bias of such springs is not affected by centrifugal force. In other words, the bias of the springs 18 is not affected at all, or is at least substantially unaffected, by the RPM of the flywheels 3 and 4. Otherwise stated, the extent to which the cantilever springs 18 can be flexed in the circumferential direction of the flywheels is not dependent upon and is not influenced by the centrifugal force which develops when the flywheels are caused to rotate.

The radially outer portions of convolutions forming part of the coil springs 7 are maintained in frictional engagement with the adjacent portions of the internal surfaces 24 of the walls 9 and 10, at least while the coil springs are acted upon by centrifugal force. Thus, the (first) force which the coil springs 7 offer to angular displacement of the flywheels 3 and 4 relative to each other under the action of the pockets 12, 13 and arms 14 acts in parallel with the (second) force which is due to frictional engagement of the springs 7 with the internal surfaces 24 of the walls 9, 10 and whose magnitude increases in response to increasing rotational speed of the flywheels. The cantilever springs 18 are positioned in parallel with the coil springs 7 and yieldably oppose rotation of the flywheels 3 and 4 relative to each other with a variable (third) force which increases in response to increasing angular displacement of the flywheels relative to each other, but is at least substantially independent of the centrifugal force.

Since the aforementioned second force increases in response to increasing RPM of the flywheels 3 and 4, it can reach a value (namely when the RPM of the flywheels rises to and exceeds a predetermined lower threshold value) at which the tendency of the springs 7 to expand does not suffice to overcome the force which develops as a result of frictional engagement between the convolutions of the springs 7 and the internal surfaces 24 of the walls 9 and 10. Thus, the length of the springs 7 can continue to decrease but these springs cannot dissipate energy as soon as the aforementioned lower threshold value of frictional engagement between the convolutions of the springs 7 and the surfaces 24 is exceeded. In other words, the damper 6 becomes "stiffer" or "harder" because its damping action is attributable to the stressing of the coil springs 7 by the pockets 12, 13 and arms 14 as well as to the frictional engagement of such springs with the walls 9 and 10 of the flywheel 3.

When the combined magnitude of the first and second forces generated by the coil springs 7 reaches a value corresponding to that which is achieved when the springs 7 cannot expand because the frictional engagement between their convolutions and the walls 9, 10 is too pronounced, the damper 6 would be likely to transmit undesirable fluctuations of torque between the two flywheels 3 and 4, particularly from the flywheel 4 to the flywheel 3 while the vehicle is coasting. Such situation could develop within a relatively narrow or a relatively wide range of rotational speeds of the composite flywheel 2. The developing resonances would be likely to generate undesirable noise, particularly while the vehicle is coasting.

The cantilever springs 18 reduce and practically eliminate the likelihood of noise generation because their bias varies only in response to angular displacement of the flywheels 3 and 4 relative to each other but is not affected by the centrifugal force, i.e., by the RPM of the composite flywheel 2. Thus, the cantilever springs 18 are effective to oppose angular displacements of the flywheels 3 and 4 relative to each other under those circumstances when the frictional engagement between their convolutions and the surfaces 24 of the walls 9 and 10 prevents the coil springs 7 from compensating for undesirable oscillations of torque transmitted from the flywheel 4 to the damper 6 and thence to the flywheel 3, while the vehicle is coasting.

The damper 6 can comprise a single cantilever spring 18 or a plurality of cantilever springs, for example, one for each of the coil springs 7.

The cantilever springs 18 of the damper 6 need not be designed to be operative while the engine of the motor vehicle is idling. For example, the springs 18 can be constructed and installed to be effective only, or especially, when the damper 6 is under load. It has been found that, when dampers of the type utilized in torque transmitting apparatus disclosed in the aforementioned published German patent applications (the disclosures of the corresponding United States patents and patent applications are incorporated herein by reference) are installed between the output elements of the engines and the input elements of variable-speed transmissions in certain types of motor vehicles, the dampers are incapable of adequately isolating the prime movers from the transmissions, i.e., the power trains between the engines and the driven units are likely to transmit oscillations or other undesirable variations of transmitted torque. The reason for this is believed to be that the oscillation-absorbing action of conventional dampers is subject to dynamic influences, primarily because the conventional dampers are affected by centrifugal force. Thus, in the absence of the cantilever springs 18, the ability of the damper 6 to absorb undesirable fluctuations of transmitted torque would be attributable solely to the action of the coil springs 7 which are influenced by angular displacements of the flywheels 3 and 4 relative to each other as well as by the RPM of the composite flywheel 2. The forces which the coil springs 7 develop as a result of angular displacement of the flywheels 3 and 4 relative to each other act in parallel with the forces which develop as a result of frictional engagement between the convolutions of the coil springs 7 and the surfaces 24 of the walls 9, 10 of the flywheel 3. The forces which develop as a result of frictional engagement of the springs 7 with the walls 9 and 10 cause the springs 7 to act as if their spring gradient were higher than in the absence of frictional engagement. As already mentioned above, the extent of frictional engagement between the convolutions of the coil springs 7 and the internal surfaces 24 of the walls 9 and 10 can rise to a value (in response to increasing RPM of the damper 6) at which the springs 7 are no longer capable of dissipating energy or cannot dissipate all of the energy which was stored as a result of angular movements of the flywheels 3, 4 from neutral positions with reference to each other and as a result of the action of centrifugal force. In other words, the coil springs 7 are no longer capable of reassuming their initial lengths and continue to store energy or to store additional energy.

The increased rigidity or stiffness of the coil springs 7 due to the influence of the centrifugal force within a certain range of rotational speeds of the damper 6 entails that, in the absence of one or more cantilever springs 18 and/or equivalent springs which are not influenced by the RPM of the damper, the damper could no longer prevent the transmission of certain resonance-induced oscillations between the output element of the engine and the input element of the transmission. Such resonance-induced oscillations of transmitted torque are likely to develop within certain RPM ranges, particularly when the damper 6 is rotated at a speed of between approximately 1800 RPM and 3500 RPM. It has been found that, by the simple expedient of equipping the damper 6 with one or more cantilever springs 18 and/or analogous springs whose bias is not influenced by variations of the RPM of the damper, the latter is capable of damping undesirable variations of torque within the aforementioned RPM range as well as within other RPM ranges which are likely to induce the development of torque oscillations which cannot be absorbed, or cannot be adequately absorbed, by the coil springs 7 alone.

That increase of rigidity or stiffness of the damper 6 which is attributable to the provision of one or more cantilever springs 18 and/or analogous springs whose operation is not affected by the centrifugal force (i.e., by the RPM of the damper) is less than that increase of rigidity or stiffness which is attributable to the action of the springs 7 when the rotational speed of the damper is within that range at which the magnitude of the aforementioned second force suffices to establish a highly pronounced frictional engagement between the convolutions of the springs 7 and the surfaces 24 of the walls 9 and 10. For example, the resistance of the coil springs 7 to rotation of the flywheels 3 and 4 relative to each other within the critical RPM range can be at least close to 120 Nm/°, and the resistance which the cantilever springs 18 and/or equivalent springs can offer to angular movements of the flywheels 3 and 4 relative to each other need not appreciably exceed 30 Nm/°.

It is often desirable and advantageous to design the damper 6 in such a way that the resistance of the coil springs 7 to angular displacement of the flywheels 3 and 4 relative to each other is less than the resistance of the spring or springs 18 within a relatively low range of rotational speeds of the damper. For example, the relatively low range of rotational speeds can include that RPM of the damper 6 when the engine is idling. However, when the RPM of the damper exceeds the relatively low range (e.g., when the rotational speed of the damper rises to or exceeds approximately 1800 RPM), the combined first and second forces generated by the coil springs 7 to oppose angular displacements of the flywheels 3 and 4 relative to each other preferably exceed the resistance of the spring or springs 18.

The damper 6 of FIGS. 1 and 2 can be modified by installing the coil springs 7 in an annular chamber of the flywheel 4. This would entail relatively minor modifications of the improved damper. It is presently preferred to select the length of the coil springs 7 in such a way that it is between about 5 and 15 times the diameters of their convolutions. Dampers utilizing arcuate coil springs with a large length-to-diameter ratio are disclosed in the aforementioned published German patent applications as well as in certain other publications including published German patent applications Nos. 37 21 711 and 37 21 712. The disclosures of the corresponding United States patents and/or patent applications are also incorporated herein by reference.

Figure 7:
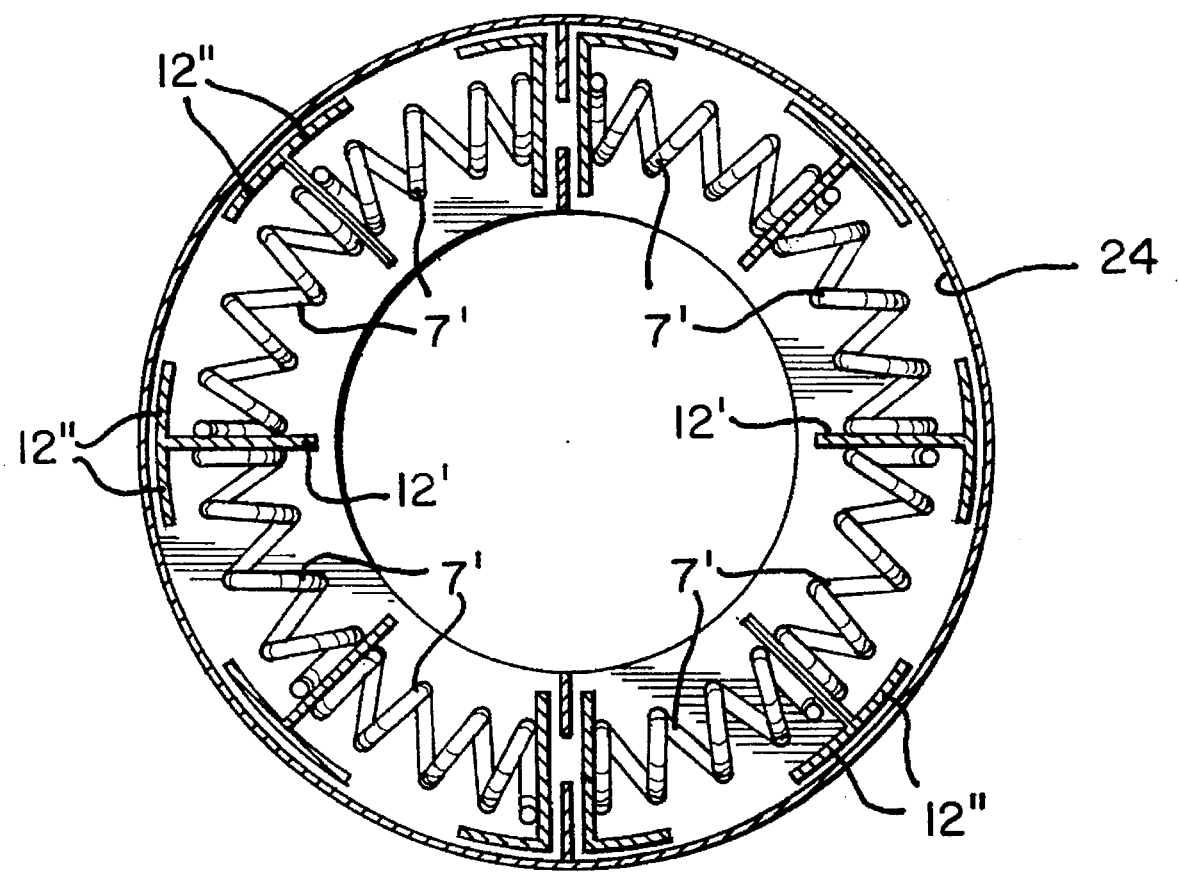
FIG. 7 illustrates a portion of a further damper.

It is further within the purview of the present invention to replace one or more elongated arcuate springs 7 with sets of shorter springs 7' which are disposed one after the other as seen in the circumferential direction of the flywheels 3 and 4. The serially arranged shorter springs 7' which are to replace at least one of the relatively long arcuate springs 7 need not have an arcuate shape. The individual springs 7' of a series of short springs can be separated from one another by abutments or stops 12, e.g., by wedge-like abutments or stops. Furthermore, and whereas the convolutions of the relatively long arcuate springs 7 forming part of the damper 6 shown in FIGS. 1 and 2 are free to come into direct contact with the internal surfaces 24 of the walls 9 and 10 (at least while the springs 7 are acted upon by centrifugal force), the relatively short springs 7' which are to replace at least one of the springs 7 can be provided with suitable guides 12" (e.g., in the form of cups or thimbles which are fitted over the end convolutions of the short springs). The short springs 7' can have straight axes in contrast with the arcuate axes of the long coil springs 7. The guides 12" can move into frictional engagement with the radially outer portions of the internal surfaces 24 of the walls 9 and 10 when the damper of FIG. 7, i.e., employing one or more sets of short springs 7' in lieu of one or more long springs 7' is acted upon by centrifugal force.

FIG. 1 shows that each of the elongated coil springs 7 surrounds an inner arcuate coil spring preferably having a length corresponding to that of the respective spring 7. The inner arcuate coil springs need not or cannot come into direct frictional engagement with the internal surfaces 24 of the walls 9 and 10 when the damper 6 is being acted upon by centrifugal force. Such inner arcuate coil springs constitute a desirable but optional feature of the improved damper 6.

Figure 4:
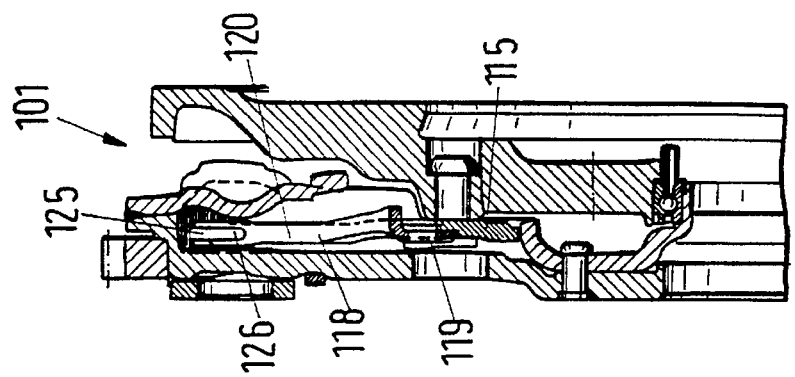
FIG. 4 is an axial sectional view of a portion of the second apparatus substantially as seen in the direction of arrow IV in FIG. 3.
Figure 3:
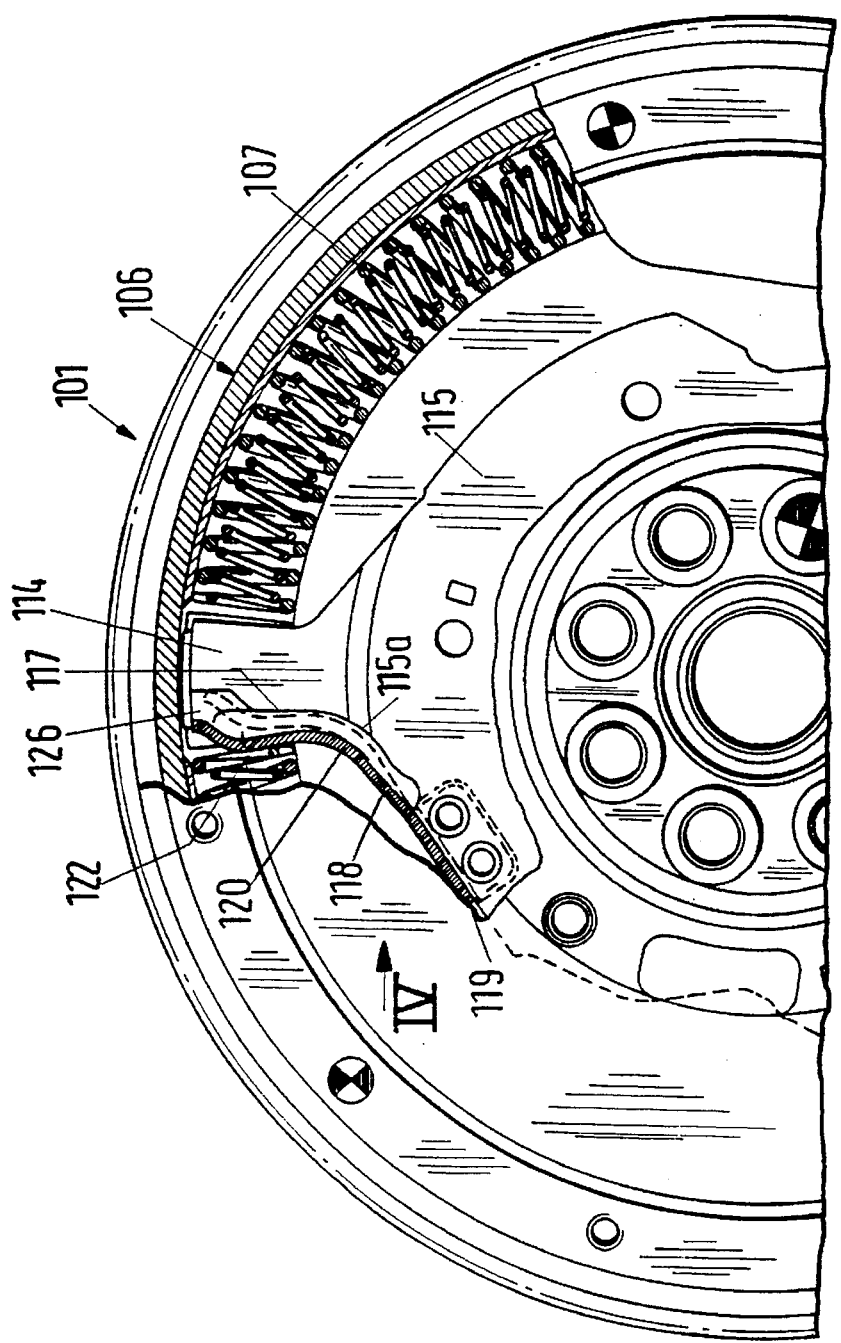
FIG. 3 is a fragmentary side elevational view of a second torque transmitting apparatus utilizing a damper which constitutes a first modification of the damper shown in FIGS. 1 and 2.

FIGS. 3 and 4 illustrate a portion of a modified torque transmitting apparatus 101. All such parts of the apparatus 101 which are identical with or clearly analogous to the corresponding parts of the torque transmitting apparatus 1 of FIGS. 1 and 2 are denoted by similar reference characters plus 100. The cantilever spring 118 which is shown in FIGS. 3 and 4 is of one piece with a washer-like member 119 which is riveted to the washer-like carrier 115 forming part of the output member of the damper 106. The spring 118 has an arcuate shape and can be deformed to move from the solid-line position to the broken-line position of FIG. 3. An intermediate portion 120 of the illustrated spring 118 resembles a relatively narrow strip which can be flexed in response to angular displacement of the two flywheels relative to each other. The carrier 115 is provided with a suitably shaped recess 115a which ensures that the carrier 115 does not interfere with the flexing of the resilient intermediate portion 120 of the spring 118 when the portion 120 undergoes deformation during angular displacement of the two flywheels relative to each other. The radially outermost portion 122 of the spring 118 shown in FIG. 3 is angularly spaced apart from the adjacent portion 117 of the arm 114 in a direction to ensure that the gap between the parts 117 and 122 narrows when the vehicle embodying the torque transmitting apparatus 101 is coasting and the two flywheels are caused to turn relative to each other.

The portions 120 of the springs 118 in the damper 106 of FIGS. 3 and 4 can come into direct engagement with the adjacent arms 114 of the output member (including the carrier 115) of the damper 106 when the latter is called upon to transmit a relatively large torque. This means that the portions 120 of the springs 118 are then clamped between the adjacent end convolutions of the respective elongated arcuate coil springs 107 and the portions 117 of the adjacent arms 114.

The radially outer part of the portion 120 of each spring 118 is provided with a cutout 125 for a projection 126 provided on the adjacent arm 114 of the carrier 115. This ensures that the portions 120 of the springs 118 are adequately guided (at least at one side) by the corresponding arms 114. When the portion 120 of the spring 118 which is shown in FIG. 3 is deformed to assume the broken-line position, the radially outer portion of the adjacent end of the corresponding elongated arcuate coil spring 107 abuts the projection 126 and the radially inner portion of such end of the corresponding spring 107 abuts the portion 120 of the adjacent spring 118.

The cantilever springs 18 or 118 can be designed and mounted in such a way that certain portions thereof move into contact with suitable abutments before the springs are subjected to maximum permissible deforming stresses. This ensures that the rigidity of the springs 18 or 118 increases during certain stages of angular movement of the two flywheels relative to each other. For example, one can change the length of the remaining part of the flexible portion of each spring 18 or 118. Alternatively, one can change the clamping or supporting action upon the cantilever springs 18 or 118.

The cantilever springs 18 and 118 are, or can be, substantially straight, i.e., they can extend substantially radially outwardly from the respective circumferentially complete washer-like portions 19 and 119. Irrespective of their exact shape, the cantilever springs can be made of one piece with the respective washer-like portions 19 and 119 or they can constitute separately produced parts which are bonded or otherwise fastened to the input member or the output member of the damper 6 or 106. The portion 19 and/or 119 can constitute a circumferentially complete dynamically balanced part.

Figure 5:
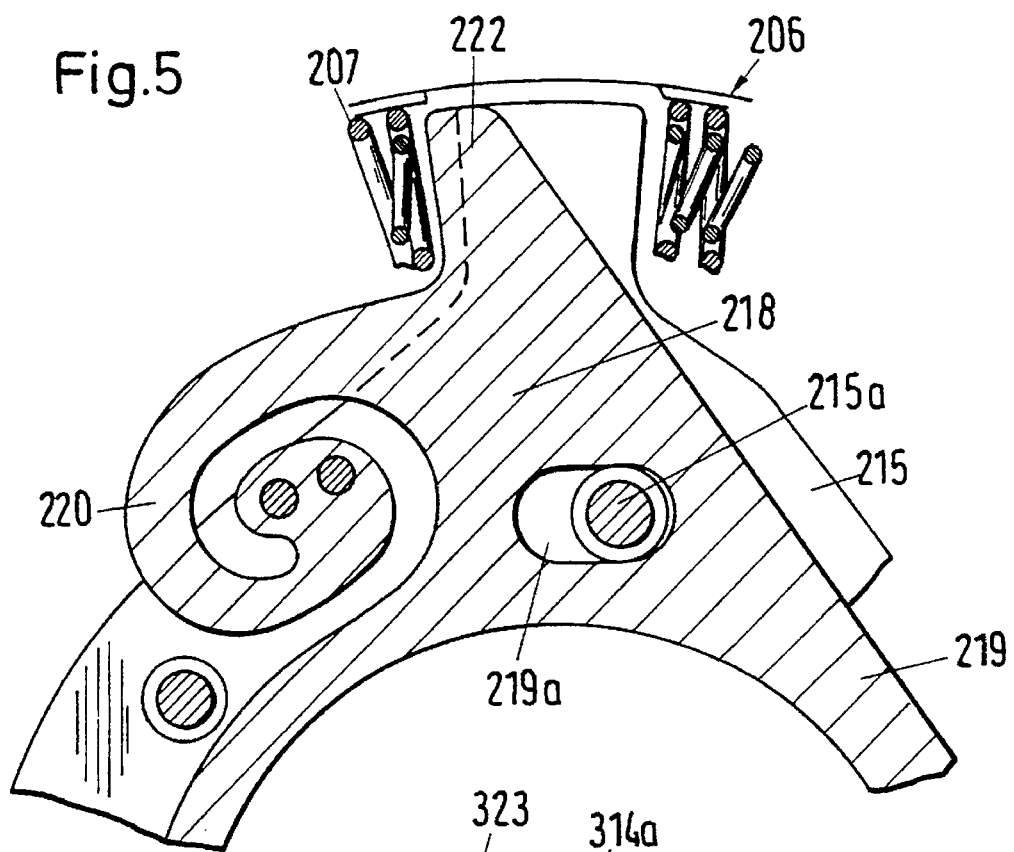
FIG. 5 illustrates certain details of a third damper.

FIG. 5 illustrates a portion of a damper 206 having two elongated arcuate coil springs 207 and two cantilever springs 218. The resiliently deformable portion 220 resembles a spiral and is of one piece with the circumferentially complete washer-like portion 219. One end of the illustrated spiral portion 220 is affixed to the input member or to the output member (including the carrier 215) of the damper 206. The portion 219 has limited freedom of angular movement relative to the carrier 215 of the output member of the damper 206. To this end, the portion 219 has a circumferentially extending arcuate slot 219a which receives with certain clearance a portion of a stud or pin 215a forming part of or affixed to the carrier 215. The radially outer portion of the spring 218 which is shown in FIG. 5 is provided with an abutment 222 for the adjacent arcuate coil spring 207.

Figure 6:
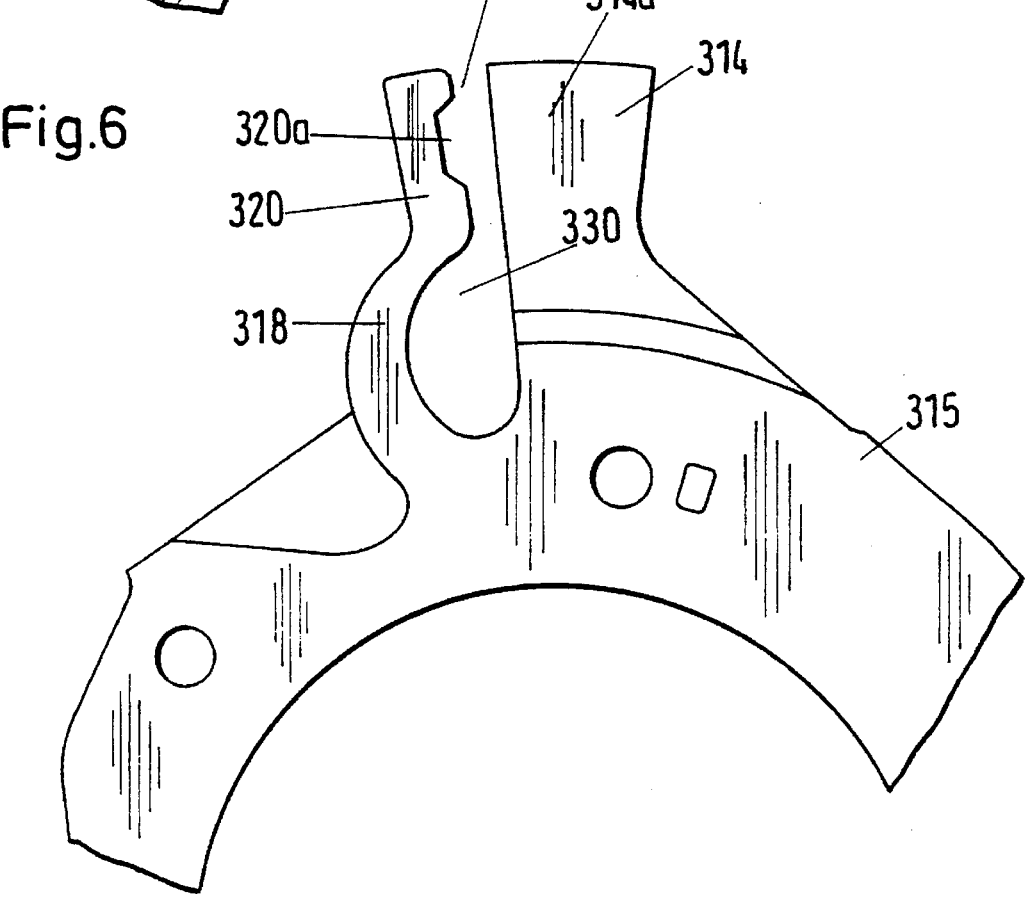
FIG. 6 illustrates certain details of a fourth damper.

FIG. 6 illustrates a portion of a damper having an output member including a washer-like carrier 315 with a plurality of radially outwardly extending arms 314 (only one shown in FIG. 6) including portions 314a confronting the adjacent radially outer portions 320 of the respective cantilever springs 318. Each spring 318 is of one piece with the carrier 315 and is separated from the adjacent arm 314 by an elongated substantially radially extending slot 323 of the carrier 315. The resiliency of the springs 318 is not affected by centrifugal force which develops in response to rotation of the damper including the structure of FIG. 6; such cantilever springs are deformed only in response to angular displacements of the two flywheels (not shown in FIG. 6) relative to each other. The radially innermost portion of each slot 323 is enlarged, as at 330, so that the adjacent portions of the springs 318 assume an arcuate shape. When the springs 318 have undergone a predetermined amount of deformation, the width of the radially outer portions of the respective slots 323 is reduced to zero, i.e., the portions 320 of the springs 318 are then compelled to abut the portions 314a of the adjacent arms 314 on the carrier 315 of the output member of the damper.

That edge face of each portion 320 which confronts the adjacent portion 314a of an arm 314 is provided with a cutout 320a which ensures the establishment of more predictable contact between the portion 320 and the adjacent portion 314a of the respective arm 314 on the carrier 315. The depth and other parameters of the slots 323 as well as the dimensions and/or other parameters of the carrier 315 are selected in such a way that the cantilever springs 318 can undergo a desired deformation but that the resultant internal stresses do not affect the useful life of the carrier 315. The depth of each slot 323 is greater than (e.g., at least twice) the length of the portion 320 of a spring 318, as measured in the radial direction of the carrier 315. The portions 320 of the cantilever springs 318 (the carrier 315 is assumed to be provided with two springs 318 which are disposed diametrically opposite each other) are engaged and flexed by the end convolutions of the adjacent elongated arcuate springs when the two flywheels of the damper embodying the structure of FIG. 6 are caused to turn relative to each other, especially while a vehicle having a power train including the damper of FIG. 6 is coasting. The arms 314 of the carrier 315 are dimensioned in such a way that they are not deformed in response to engagement by the portions 320 of the adjacent cantilever springs 318 and/or by the adjacent end convolutions of the coil springs.

The cantilever springs 318 of the type shown in FIG. 6 need not be made of one piece with the carrier 315. For example, the damper of FIG. 6 can comprise one or more washer-like components (corresponding to the washer-like portion or member 19, 119 or 219) which are affixed to the carrier 315 and each of which is provided with at least one cantilever spring 318 capable of undergoing elastic deformation in response to angular movement of the input and output members of the damper relative to each other. The elastic deformation of the cantilever springs is terminated when they come into abutment with the portions 314a of the adjacent arms 314 on the carrier 315. Prior to undergoing deformation in response to angular displacement of the input and output members of the damper relative to each other, the radially outer portions of the cantilever springs 318 extend forwardly of and beyond the adjacent arms 314 as seen in the circumferential direction of the flywheels (not shown in FIG. 6). Thus, the radially outer portions of the springs 318 can be engaged by the adjacent end convolutions of the respective elongated coil springs before such springs come into actual contact with the portions 314a of the respective arms 314. At such time, the portions 320 of the springs 318 are propped by the adjacent arms 314 so that the springs 318 are held against additional deformation in response to further angular displacement relative to one another of the input and output members of a damper that includes the structure of FIG. 6.

The improved torque transmitting apparatus and/or its damper is susceptible of numerous additional modifications without departing from the spirit of the present invention. For example, certain features of the damper 6, 106 and/or 206 can be combined with each other and/or with the features of the damper including the structure shown in FIG. 6. Furthermore, certain features of the dampers shown in FIGS. 1–2, 3–4, 5 and 6 can be interchanged or can be incorporated in torque transmitting apparatus disclosed in the aforementioned published German patent applications and/or in the aforementioned patent to Reik et al. to thus convert such conventional apparatus into apparatus embodying the present invention.

Certain features of the improved torque transmitting apparatus and/or of its damper are believed to be sufficiently novel and unobvious to constitute independent inventions which warrant protection by one or more additional patents.

It is further clear that one or more cantilever springs or other suitable springs which are not affected by centrifugal force, or are not appreciably affected by centrifugal force, but only by the extent of angular displacement of the input and output members of the damper relative to each other, can be put to use in the illustrated dampers and/or in other types of dampers to replace the illustrated cantilever springs or to be utilized with the illustrated cantilever springs to undergo deformation in response to angular displacement of the input and output members of the damper while the vehicle is in the process of pulling a load. Thus, one or more cantilever springs and/or equivalent springs can be used to undergo deformation while the vehicle is coasting and one or more cantilever springs and/or equivalent springs can be used to undergo deformation while the vehicle is in the process of pulling a load. For example, one or more springs which are not affected by centrifugal force can be utilized in the improved damper to undergo deformation while the vehicle is towing a load if the prime mover and/or the power train is likely to generate noise while the damper is rotated at a speed within one or more ranges of rotational speeds. Still further, the improved apparatus can be designed to employ a damper having one or more cantilever springs and/or equivalent springs which are caused to store energy only while the vehicle is in the process of towing a load.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. Apparatus for transmitting torque between a variable-speed rotary output element and a variable-speed rotary input element, comprising a damper including coaxial input and output members rotatable with and relative to each other about a common axis; arcuate first resilient storing elements disposed at a radial distance from said axis to yieldably resist rotation of said members relative to each other in at least one direction with a first force which increases in response to increasing angular displacement of said members relative to each other in said at least one direction, and to frictionally engage at least one of said members under the action of centrifugal force with a second force which acts in parallel with said first force and increases in response to increasing speed of said members, said first resilient elements having a width—as measured radially of said axis—and a length—as measured in a circumferential direction of said members—which is a multiple of said width; and at least one second energy storing element positioned in series with said first energy storing elements to yieldably oppose rotation of said members relative to each other in said at least one direction with a variable third force which increases in response to increasing angular movement of said members relative to each other in said at least one direction but is at least substantially independent of the centrifugal force.

2. The apparatus of claim 1, wherein at least one of said first energy storing elements includes at least one coil spring.

3. The apparatus of claim 1, wherein one of said members defines an annular chamber for said first energy storing elements.

4. The apparatus of claim 1, wherein each of said first energy storing elements comprises an elongated arcuate coil spring.

5. The apparatus of claim 1, wherein at least one of said first energy storing elements includes a series of springs disposed one behind the other in a circumferential direction of said members.

6. The apparatus of claim 5, wherein said springs include at least one coil spring.

7. The apparatus of claim 1, wherein said at least one second energy storing element comprises a cantilever spring.

8. The apparatus of claim 1, wherein one of said members includes a substantially disc-shaped carrier and said at least one second energy storing element is of one piece with said carrier.

9. The apparatus of claim 8, wherein said output member includes a first portion, a second portion including said carrier, and means for affixing said second portion to said first portion.

10. The apparatus of claim 1, wherein said at least one second energy storing element is operative to yieldably oppose rotation of said members relative to each other only when said input element transmits torque to said output element.

11. The apparatus of claim 10, wherein said damper forms part of a power train in a motor vehicle and said at least one second energy storing element yieldably opposes rotation of said members relative to each other while the vehicle is coasting.

12. The apparatus of claim 1, wherein said at least one second energy storing element includes a spring having a torsional spring rate of between about 15 Nm/° and 50 Nm/°.

13. The apparatus of claim 12, wherein said torsional spring rate is between about 25 Nm/° and 40 Nm/°.

14. The apparatus of claim 1, wherein said at least one second energy storing element is positioned to yieldably oppose rotation of said members relative to each other in said at least one direction through an angle of between about 1.5° and 5°.

15. The apparatus of claim 14, wherein said angle is between about 2° and 4°.

16. The apparatus of claim 14, wherein said damper forms part of a power train in a motor vehicle and said at least one second energy storing element yieldably opposes rotation of said members relative to each other at least while the vehicle is coasting.

17. The apparatus of claim 1, wherein said damper forms part of a power train in a motor vehicle and said third force exceeds a sum of said first and second forces while the prime mover of the motor vehicle is idling and at least while said first force begins to increase.

18. The apparatus of claim 1, wherein said damper forms part of a power train in a motor vehicle and a sum of said first and second forces at most equals said third force while the prime mover of the motor vehicle is idling and at least while said first force begins to increase.

19. The apparatus of claim 1, wherein said input and output elements are rotatable within a range of relatively low speeds and within a range of second speeds higher than said relatively low speeds, a sum of said first and second forces being greater than said third force at least within said range of second speeds.

20. The apparatus of claim 1, wherein at least one of said input and output members comprises a flywheel.

21. Apparatus for transmitting torque between a variable-speed rotary output element and a variable-speed rotary input element, comprising a damper including coaxial input and output members rotatable with and relative to each other about a common axis, one of said members including a substantially disc-shaped carrier; elongated arcuate first resilient energy storing elements disposed at a radial distance from said axis to yieldably resist rotation of said members relative to each other in at least one direction with a first force which increases in response to increasing angular displacement of said members relative to each other in said at least one direction, and to frictionally engage at least one of said members under the action of centrifugal force with a second force which acts in parallel with said first force and increases in response to increasing speed of said members; and at least one second energy storing element positioned in series with said first energy storing elements to yieldably oppose rotation of said members relative to each other in said at least one direction with a variable third force which increases in response to increasing angular movement of said members relative to each other in said at least one direction but is at least substantially independent of the centrifugal force, said at least one second energy storing element being of one piece with said carrier and said output member including a first portion, a second portion including said carrier, and means for affixing said second portion to said first portion.

\* \* \* \* \*